United States Patent
Sullivan

(10) Patent No.: US 7,274,407 B2
(45) Date of Patent: Sep. 25, 2007

(54) METHOD AND APPARATUS FOR ENCODING VIDEO CONTENT

(75) Inventor: Gary J. Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 217 days.

(21) Appl. No.: 11/171,743

(22) Filed: Jun. 30, 2005

(65) Prior Publication Data

US 2005/0253968 A1 Nov. 17, 2005

Related U.S. Application Data

(63) Continuation of application No. 09/982,127, filed on Oct. 18, 2001, now Pat. No. 7,023,492.

(60) Provisional application No. 60/241,296, filed on Oct. 19, 2000.

(51) Int. Cl.
*H04N 7/18* (2006.01)

(52) U.S. Cl. .................................................. 348/588

(58) Field of Classification Search ........ 348/563–565, 348/584, 588, 598; 725/60, 109; 375/240.1
See application file for complete search history.

(56) References Cited

U.S. PATENT DOCUMENTS

| | | |
|---|---|---|
| 5,623,308 A | 4/1997 | Civanlar et al. |
| 5,936,616 A | 8/1999 | Torborg, Jr. et al. |
| 5,995,146 A | 11/1999 | Rasmussen |
| 6,020,931 A * | 2/2000 | Bilbrey et al. ............... 348/584 |
| 6,049,333 A | 4/2000 | LaJoie et al. |
| 6,078,403 A | 6/2000 | Palmer |
| 6,088,045 A | 7/2000 | Lumelsky et al. |
| 6,141,442 A | 10/2000 | Chen |
| 6,256,785 B1 | 7/2001 | Klappert et al. |
| 6,263,313 B1 * | 7/2001 | Milsted et al. .................. 705/1 |
| 6,456,335 B1 | 9/2002 | Miura et al. |
| 6,493,008 B1 * | 12/2002 | Yui ............................ 715/840 |
| 6,510,177 B1 * | 1/2003 | De Bonet et al. ........ 375/240.16 |
| 6,724,434 B1 | 4/2004 | Aaltonen |
| 7,023,492 B2 * | 4/2006 | Sullivan ...................... 348/565 |
| 7,120,924 B1 * | 10/2006 | Katcher et al. ............... 725/60 |

OTHER PUBLICATIONS

ISO/IEC, "Coding of Moving Pictures and Associated Audio for Digital Storage Media at Up to About 1.5 Mbit/s, Part 2: Video," 11172-2, 112 pp. (1993).

(Continued)

*Primary Examiner*—Paulos Natnael
(74) *Attorney, Agent, or Firm*—Klarquist Sparkman, LLP

(57) ABSTRACT

A system identifies video data to be encoded as well as multiple display regions associated with a particular video display type. Each of the multiple display regions is associated with a different portion of an image associated with the video data. The video data is encoded such that the encoded video data includes information regarding the multiple display regions. Each of the multiple display regions has an associated display region identifier. Additionally, the system may identify an active region of the video data. The active region may be located anywhere within an image associated with the video data. The video data is encoded such that the encoded video data includes information regarding the active region.

17 Claims, 10 Drawing Sheets

OTHER PUBLICATIONS

ISO/IEC, "Coding of Audio-Visual Objects: Visual, ISO/IEC 14496-2," 14496-2, 330 pp. (1998).

ITU-T Recommendation H.261, "Line of Transmission of Non-Telephone Signals," International Telecommunications Union, pp. i, 1-25 (Mar. 1993).

ITU-T Recommendation H.262, "Transmission of Non-Telephone Signals," International Telecommunications Union, 204 pp. (Jul. 1995).

ITU-T Recommendation H.263, "Series H: Audiovisual and Multimedia Systems, Infrastructure of Audiovisual Services—Coding of Moving Video," International Telecommunications Union, 155 pp. (Feb. 1998).

Reader, "History of MPEG Video Compression—Ver. 4.0," 99 pp. [Document marked Dec. 16, 2003].

Sullivan et al., "The H.264/AVC Advanced Video Coding Standard: Overview and Introduction to the Fidelity Range Extensions," 21 pp. (Aug. 2004).

Wiegand, "Joint Model No. 1, Revision 1 (JM1-r1)," JVT-A003r1, 80 pp. (Document marked "Generated: Jan. 18, 2002").

U. Ladebusch, "Co-ordination of Identification Numbers for DVB (Digital Video Broadcasting) Programs," Fernseh- und Kino-Technik, vol. 54, No. 7, Jul. 2000, pp. 410-414.

R. Muranol, J. Zhao, R. Hayasaka, M.Ito and Y. Matsushita., "Video Retrieval Method Using ShotID for Copyright Protection Systems," Part of the SPIE Conference on Multimedia Storage and Archiving Systems III, Boston, MA. Nov. 1998, SPIE vol. 3527, pp. 245-252.

Z. Mlao-Ling and W. Dong-Hui, "Video Stream Segmentation Method Based on Video Page," Journal of Computer Aided Design & Computer Graphics, vol. 12, No. 8, Aug. 2000, pp. 585-589.

R. Schumeyer and K. Bamer, "A Color-Based Classifier for Region Identification in Video," SPIE vol. 3309, pp. 189-200.

\* cited by examiner

METHOD AND APPARATUS FOR ENCODING VIDEO CONTENT

RELATED APPLICATIONS

This application is a Continuation of U.S. patent application Ser. No. 09/982,127, filed Oct. 18, 2001, entitled "Method and Apparatus for Encoding Video Content," now U.S. Pat. No. 7,023,492, and incorporated herein by reference. That application claims the benefit of U.S. Provisional Application No. 60/241,296, filed Oct. 19, 2000, the disclosure of which is incorporated herein by reference.

TECHNICAL FIELD

The present invention relates to video encoding systems and, more particularly, to an encoding system and method that provides multiple display regions for a particular display type. The present invention further provides a flexible mechanism for specifying the portions of an image to display.

BACKGROUND

Video content may be encoded using various encoding techniques. Today there are many different types of display devices that may eventually display encoded video content. These different display devices include televisions having different aspect ratios (e.g., a 16:9 aspect ratio or a 4:3 aspect ratio) or different screen resolutions (e.g., 480 vertical lines of resolution or 1080 vertical lines of resolution), computer monitors having different aspect ratios and/or picture resolutions, and portable video players with various aspect ratios and different screen resolutions. The use of the display may also include using only a sub-regions of such display devices rather than filling the entire display with a single video content stream (e.g., "picture-in-picture" or display in a "window" on a computer screen). At the time the video content is encoded, it may not be known which display types may eventually display the video content, and the same encoded content may be used in a wide variety of display environments.

FIG. 1 illustrates a conventional system 100 for processing and distributing video content. The video content is captured using a video camera 102 (or any other video capture device) that transfers the captured video content onto video tape or another storage medium. Later, the captured video content may be edited using a video editor 104. A video encoder 106 encodes the video content to reduce the storage space required for the video content and/or to reduce the transmission bit rate required to transmit the video content. Various encoding techniques may be used to compress the video content, such as the MPEG-2 (Moving Picture Experts Group 2nd generation) compression format.

The encoded video content is provided to a transmitter 108, which transmits the encoded video content to one or more receivers 110 across a communication link 112. Communication link 112 may be, for example, a physical cable, a satellite link, a terrestrial broadcast, an Internet connection, a physical medium (such as a digital versatile disc (DVD)) or a combination thereof. A video decoder 114 decodes the signal received by receiver 110 using the appropriate decoding technique. The decoded video content is then displayed on a video display 116, such as a television or a computer monitor. Receiver 110 may be a separate component (such as a set top box) or may be integrated into video display 116. Similarly, video decoder 114 may be a separate component or may be integrated into the receiver 110 or the video display 116.

Video content may be captured and encoded into a format having a particular aspect ratio (such as 16:9) and later displayed on a video display having a different aspect ratio (such as 4:3). Various methods are available for displaying an image on a video display having a different aspect ratio. FIGS. 2A and 2B illustrate two possible methods for displaying an image having a 4:3 aspect ratio on a video display having a 16:9 aspect ratio. In FIG. 2A, a 16:9 video display 200 is not completely filled by the 4:3 image (located between the broken lines). Thus, blank side bars 202 are located on opposite sides of video display 200.

Another alternative for displaying a 4:3 image on a 16:9 video display is shown in FIG. 2B. In this situation, the width of the 4:3 image is expanded horizontally to align with the sides of the 16:9 video display 200. However, this expansion causes the top and bottom portions of the image to extend past the physical limits of video display 200. Thus, top and bottom portions 210 of the image are not displayed on video display 200.

FIGS. 2C and 2D illustrate methods for displaying an image having a 16:9 aspect ratio on a video display having a 4:3 aspect ratio. In FIG. 2C, a video display 250 has a 4:3 aspect ratio. The 16:9 image 252 is positioned between the two broken lines. Since the aspect ratio of the image is different from the aspect ratio of video display 250, two blank bars 254 are created across the top and bottom of the video display. The display format shown in FIG. 2C is commonly referred to as "letterboxing."

In FIG. 2D, the height of the 16:9 image is expanded vertically to align with the top and bottom edges of the 4:3 video display 250. However, this expansion causes the sides of the image to extend past the physical limits of video display 250. Thus, side portions 260 of the image are not displayed on video display 250. The display format shown in FIG. 2D is commonly referred to as "overscanning" or "pan and scan."

In existing video encoding systems, the encoded video content includes an indication of how to display the encoded video image on different types of displays. For example, if a video image has a 16:9 aspect ratio, the encoded video image includes information regarding how to display the video image on a video display having a 4:3 aspect ratio or a 2.3:1 aspect ratio. However, the information for each different type of video display (e.g., different aspect ratios) has a single option for displaying the image on that type of video display. Existing systems do not support multiple different image display regions that are specified in the video content stream and associated with a particular type of video display. For example, these different image display regions may focus on different characters appearing in the video content. Although existing systems allow a user to select among different pre-defined display formats (such as letterboxing or overscanning), these systems do not support multiple different encoder-specified image display regions, as described herein. Typically, if multiple display regions are specified, they are pre-defined display formats that are defined in the decoder rather than being transmitted with the video content stream.

Additionally, if a portion of an image is to be deleted after decoding (for example, because the output of the decoder is not a multiple of the fundamental "macroblock" dimensions used to represent the video in a compressed domain), existing video encoding systems typically delete content along the right edge of the image and/or along the bottom edge of the image. These systems may not provide the ability to specify which portion of the image to discard if a portion of the image needs to be deleted. Instead, these systems can only delete the portion of the image along the right edge or the bottom edge. Existing systems do not provide support for multiple different image framings for a given display type combined with the ability to delete specific portions of the image.

The systems and methods described herein address the above limitations by providing a system that encodes video content such that a user of a video display can select among multiple image framings for displaying the encoded image on the video display. Moreover, the video encoding systems and methods described herein are capable of specifying the particular portion of an image to be deleted if a portion of the image needs to be discarded.

SUMMARY

The systems and methods described herein allow video content to define (e.g., within the video content stream) several different display regions for each type of video display device, thereby allowing the user of the video display device to determine, based on the user's preferences, the manner in which the video content is displayed. Thus, the user of the video display device is not limited to a single display region for a given display aspect ratio or to pre-defined display formats (such as letterboxing or overscanning). Additionally, the systems and methods described herein allow for the identification of an active region, which defines the portion of the image that has meaningful information. This active region may be located anywhere within the image, thereby providing flexibility in determining which portions of the image to discard and which portions of the image to display, based on framing the identified active region area in relation to the chosen defined display region.

In one embodiment, video data to be encoded is identified. Additionally, multiple display regions associated with each particular video display type are identified. Each of the multiple display regions is associated with a different portion of an image associated with the video data. The video data is encoded such that the encoded video data includes information regarding the multiple display regions.

In another embodiment, the encoded video data is stored using a storage device.

In a described embodiment, the encoded video data is transmitted to multiple destinations.

In a particular implementation, each display region has an associated display region identifier.

Another embodiment identifies the area of the video content containing valid material that may be suitable for display. An active region of the video data to be encoded is identified. The active region may be located anywhere within an image associated with the video data. Multiple display regions associated with the video data are also identified. The video data is encoded such that the encoded video data includes an indication of the active region and includes information sufficient to specify the intersection of the multiple display regions with that active region.

DETAILED DESCRIPTION

The systems and methods described herein allow video data to define multiple display regions for each type of video display device on which the video data may be displayed. This permits each user to select among the various display regions based on that user's viewing preferences. For example, one user may choose to view all of the video data, which may create blank bands along the top and bottom edges of the video display device. Another user may choose to have the display device's screen filled with the video data, which may cause some portions of the left and right edges of the video image to be cropped to fill the display device. Another user may choose to have the displayed video image focus on a particular actor or actress in the program or movie being displayed. Thus, portions of the image may be reduced and/or cropped depending on the particular display region selected by the user, and the encoded representation of the video data includes identification of the display regions that can be selected for display (for example, identification of which region focuses on a particular actor).

The systems and methods described herein also allow an active region to be identified. The active region defines the portion of the image that has meaningful information. The active region typically excludes portions of the image that contain artifacts or other undesirable data. The active region may be located anywhere within the image, thus providing flexibility in defining which portions of the image should be discarded and which portions of the image should be displayed. In combination with the identification of a display region, the area to be shown on the display would consist of the intersection of the active region with the chosen display region.

Figure 1:
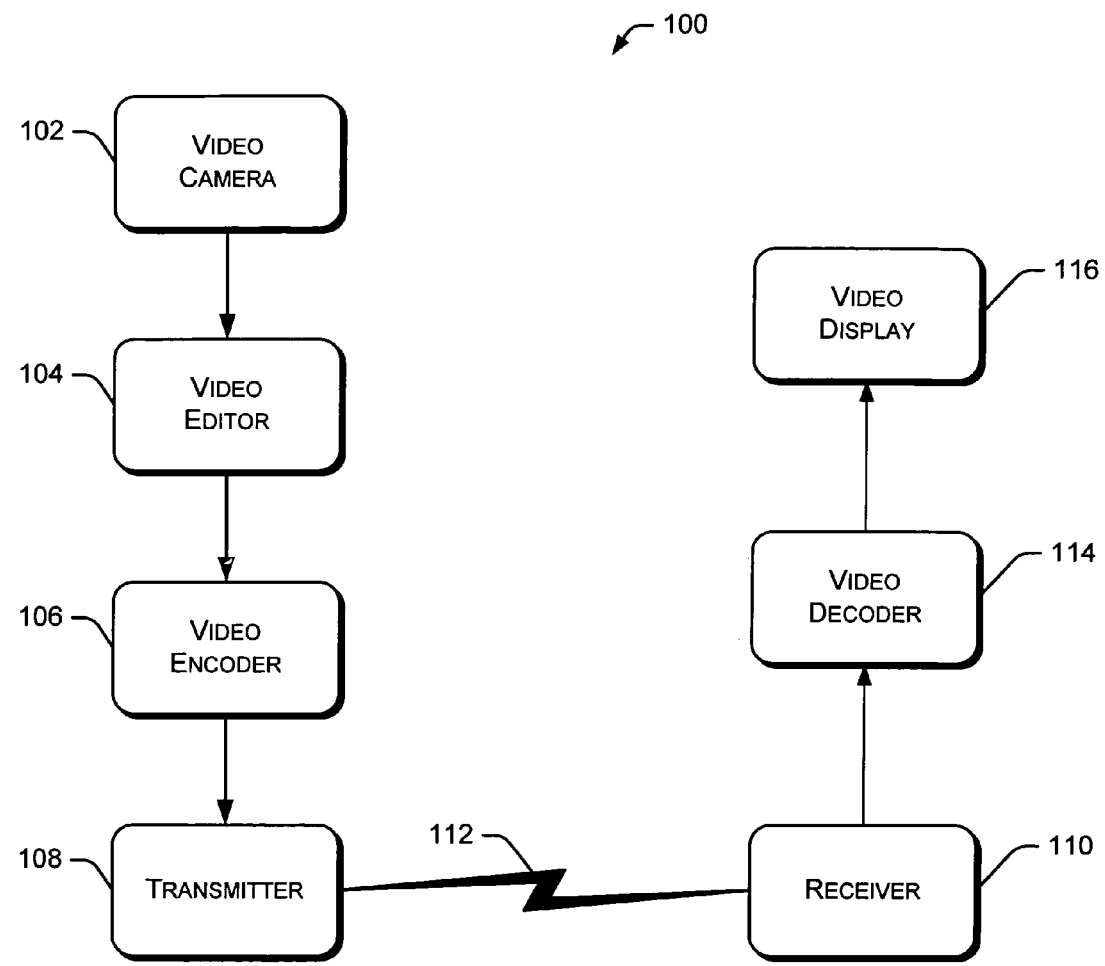
FIG. 1 illustrates a conventional system for processing and distributing video content.
Figure 2A:
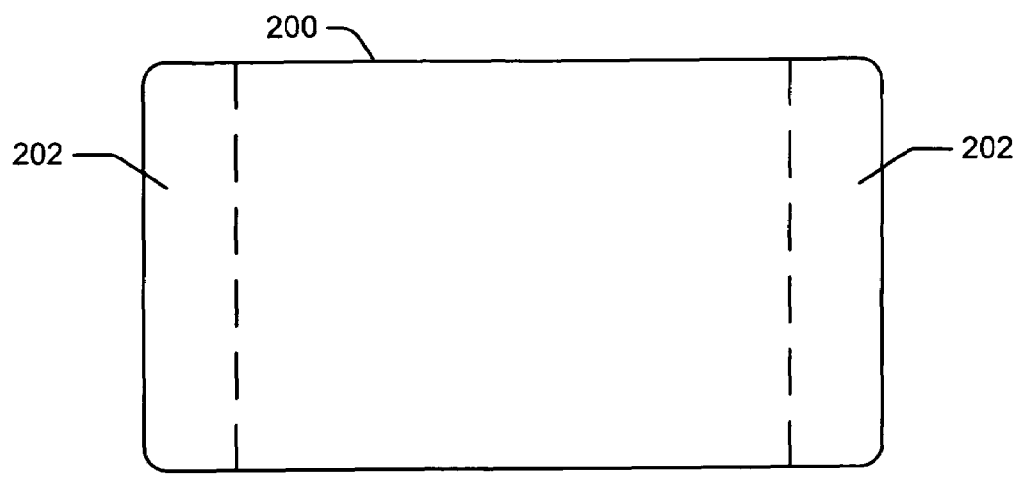
FIGS. 2A and 2B illustrate two possible methods for displaying an image having a 4:3 aspect ratio on a video display having a 16:9 aspect ratio.
Figure 2B:
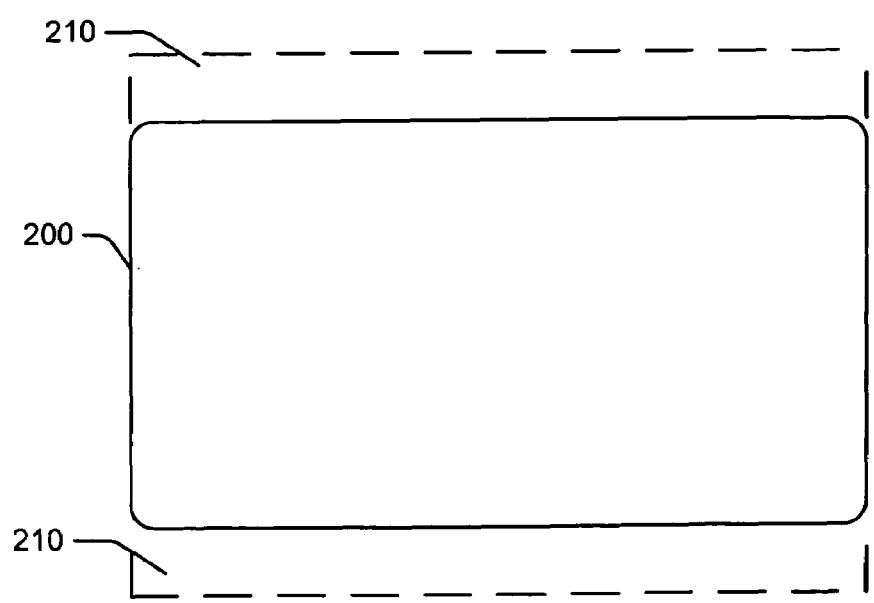
Figure 2C:
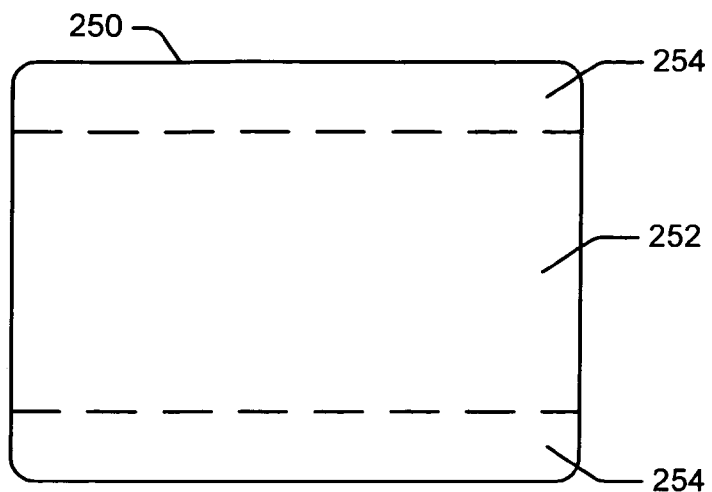
FIGS. 2C and 2D illustrate methods for displaying an image having a 16:9 aspect ratio on a video display having a 4:3 aspect ratio.
Figure 2D:
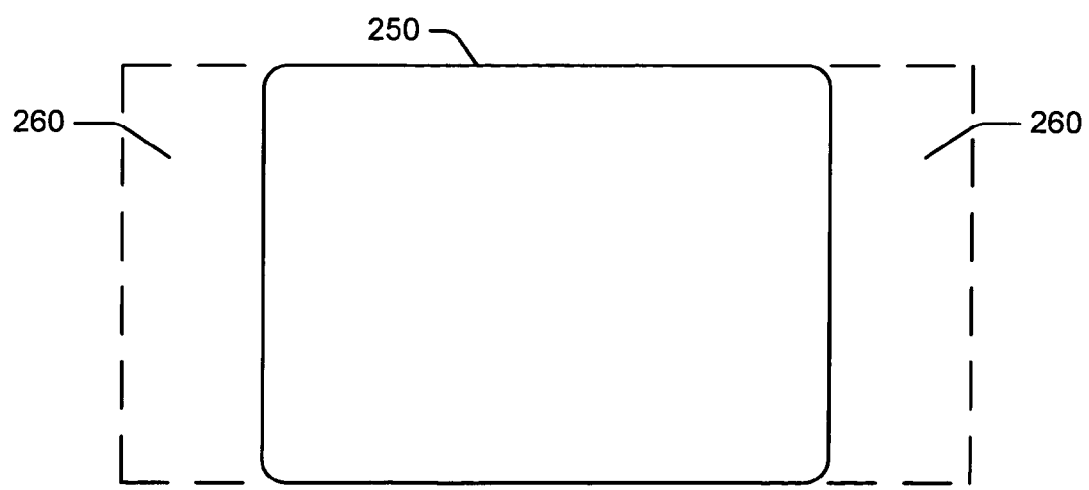
Figure 3:
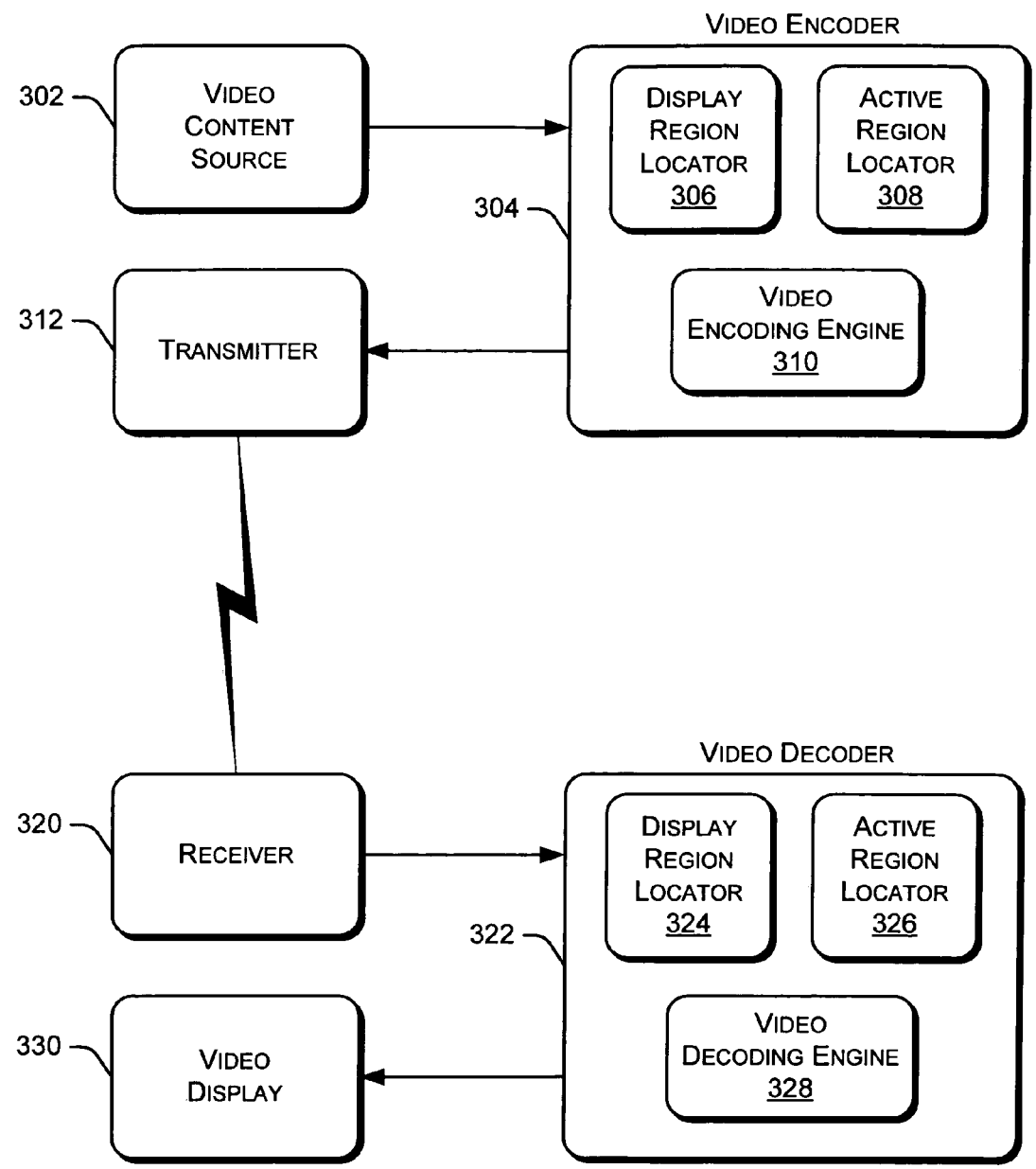
FIG. 3 illustrates an example video encoding system and an example video decoding system.

FIG. 3 illustrates an example video encoding system and an example video decoding system. A video content source 302 provides video content to a video encoder 304. Video content source may be, for example, a video camera or other capture device, or a storage device that stores previously captured video content. Video encoder 304 includes a display region locator 306 and an active region locator 308. Display region locator 306 defines one or more display regions associated with particular video content. As discussed above, a particular display region may attempt to capture the entire image as intended by the producer of the image. Another display region may focus on the important action in each image while other display regions can focus on specific characters or other areas of interest in the image. The location of the display region within the image may change from one frame of the video image to the next (e.g., as the action or as a specific character moves in the image). The location of each display region may be defined by indicating particular points within the image that define the four corners of each display region, for example by specifying the location of the top left corner and the bottom right corner of the display region. This location data (as well as an identifier associated with each display region) may be encoded within the video signal or may be transmitted along with the video signal.

Active region locator 308 identifies an active region associated with particular video content. Video encoder 304 also includes a video encoding engine 310, which encodes video content and other data (such as display region information and active region information). The output of video encoder 304 is communicated to a transmitter 312, which transmits the encoded video signal to one or more receivers. Alternatively, transmitter 312 may be a storage device that stores the encoded video signal (e.g., on a DVD or other memory device).

Receiver 320 receives an encoded video signal and communicates the received signal to a video decoder 322. Alternatively, receiver 320 may be a device (such as a DVD player) capable of reading stored encoded video content (e.g., stored on a DVD). Video decoder 322 includes a display region locator 324 and an active region locator 326. Display region locator 324 identifies one or more display regions encoded in the video signal (or transmitted along with the video signal). Active region locator 326 identifies an active region encoded in the video signal. Video decoder 322 also includes a video decoding engine 328 which decodes the encoded video signal, including the various display regions associated with the video signal. After decoding the video signal, video decoder 322 communicates the decoded video content to a video display 330 which renders the image defined by the decoded video content. Video decoder 322 may be a separate device or may be incorporated into another device, such as a television or a DVD player.

As mentioned above, a video image may be captured using one aspect ratio (such as 16:9) and displayed on video display devices having different aspect ratios (such as 4:3). Providing multiple display regions for each type of video display device allows a user to choose how the image is displayed based on the user's viewing preferences. Further, the multiple display regions allow a user to focus the display on a particular character or feature of the video content.

Figure 4:
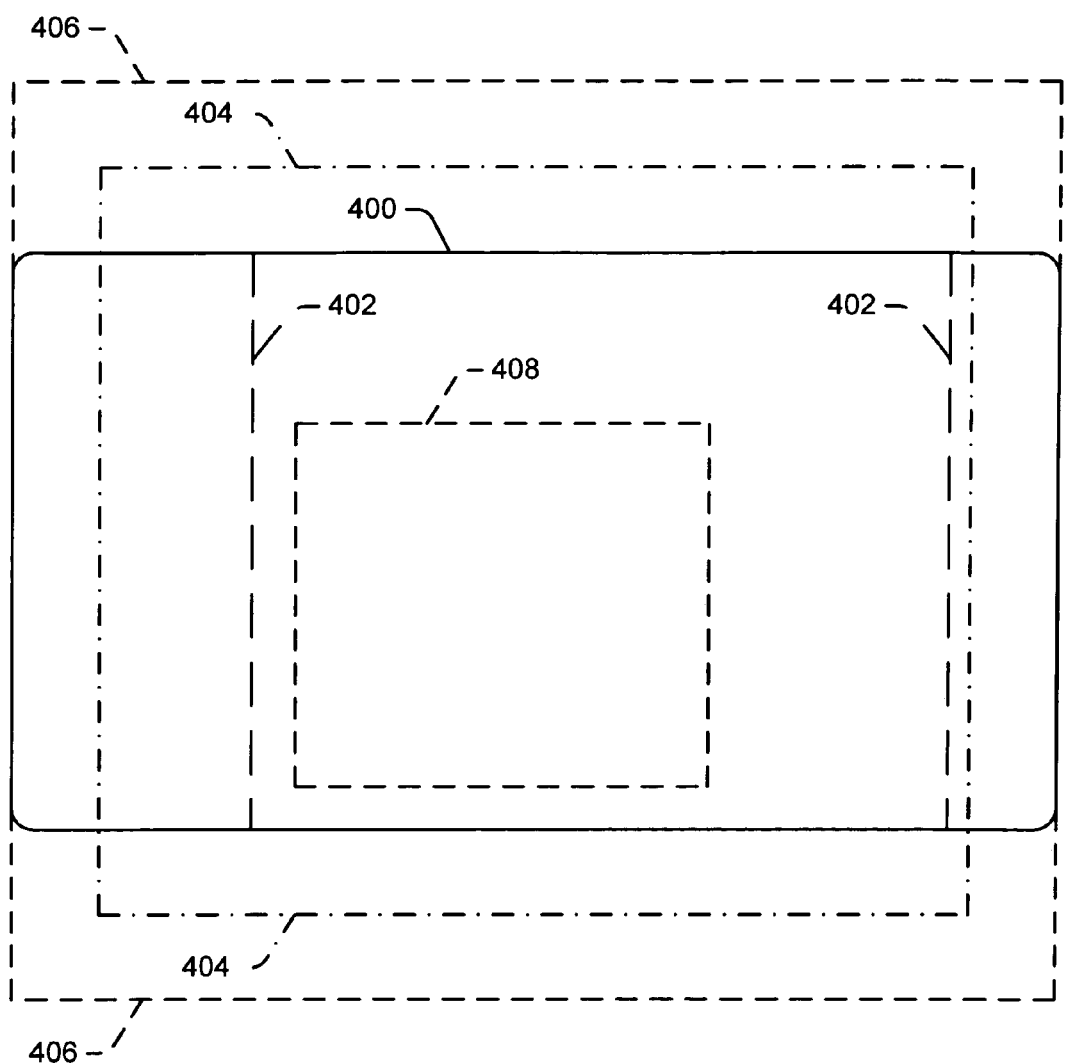
FIG. 4 illustrates an original video image having a 16:9 aspect ratio and multiple options for displaying the original video image on a video display having a 4:3 aspect ratio.

FIG. 4 illustrates an original video image 400 having a 16:9 aspect ratio and multiple options for displaying the original video image on a video display having a 4:3 aspect ratio. Note that FIG. 4 is not necessarily drawn to scale. In this example, the original video image was encoded with information identifying four different display regions (also referred to as "views") of the original video image for display on a video display having a 4:3 aspect ratio. Each of the four display regions presents a different portion of the original video image on the video display. Certain display regions may cause the right and left edges (and/or the top and bottom edges) of the original video image to be deleted (or "cropped"). Other display regions may include blank bars along the top and bottom edges of the display region.

The original video image 400 is identified by a solid line. A first display region 402 aligns the top and bottom edges of the video display with the top and bottom edges of the original video image 400. Display region 402 has a 4:3 aspect ratio, which matches the video display. In this situation, the entire 4:3 video display is filled, but the right and left edges of the original video image 400 are deleted (i.e., the portions between broken lines 402 and the sides of the original video image 400). As shown in FIG. 4, display region 402 is not necessarily centered between the left and right edges of the original video image 400. Further, the location of display region 402 may move from one frame to the next to follow the action of the video content or to focus on the portion of the video content that is most important to the producer of the video content.

A second display region 406 aligns the right and left edges of the video display with the right and left edges of the original video image 400. Display region 406 has a 4:3 aspect ratio, which matches the video display. In this situation, the 4:3 video display is filled to the left and right edges, but blank bands are located along the top and bottom edges of the video display. The blank bands extend from the top of the original video image 400 to the top of display region 406, and from the bottom of the original video image 400 to the bottom of display region 408.

A third display region 404 represents a compromise between display regions 402 and 406. Display region 404 also has a 4:3 aspect ratio, which matches the video display. In this situation, a portion of the original video image 400 is deleted along the left and right edges (i.e., the portion between broken line 404 and the right and left edges of the original video image). The portion of the original video image 400 that is deleted is approximately one-half the amount that is deleted by display region 402. Additionally, black bands are located along the top and bottom edges of the video display. The black bands extend from the top of the original video image 400 to the top of display region 404. The black bands created by third display region 404 are approximately one-half the size of the black bands created by display region 406.

A fourth display region 408 focuses on a particular character or object in the original video image 400 (e.g., the viewer's favorite actor or actress). Display region 408 typically moves around the original video image 400 to follow the particular character or object. In another implementation, display region 408 may be enlarged to fill all (or a majority) of the screen of the display device (e.g., zoom in on the particular character or object). Alternative embodiments may include any number of different display regions associated with a particular video display type (e.g., a 4:3 aspect ratio television).

If the actor or object being highlighted by the display region is not present in a particular scene, then there may be no region identifier identified with that actor or object for that scene. In this situation, the system may switch to a different display region that shows other characters and objects in the scene. When the preferred actor or object returns to the scene, the system can switch back to the display region that highlights that actor or object.

Thus, the user of the video display can select among the four different display regions, depending on their viewing preferences. The first display region 402 fills the 4:3 video display, but deletes the greatest portion of the original video image 400. The second display region 406 contains all of the original video image 400, but has the largest blank bars along the top and bottom edges of the 4:3 video display. The third display region 404 reduces the size of the blank bars along the top and bottom edges of the 4:3 video display, but also deletes a portion of the original video image 400. The fourth display region 408 focuses on a particular character or object and deletes most of the remaining portions of the image. This allows the user to select the appropriate display region based on their viewing preference. Further, a user may watch the same video content at different times selecting different display regions.

FIG. 4 represents a particular example in which an original video image with a 16:9 aspect ratio has four different display regions for a video display having a 4:3 aspect ratio. However, a particular original video image may include any number of display regions for any number of different video display types (such as 4:3 aspect ratio, 2.3:1 aspect ratio, high resolution 16:9 aspect ratio, and low resolution 16:9 aspect ratio). For example, the 4:3 aspect ratio display type may have four different display regions and the high resolution 16:9 aspect ratio display type may have only two display regions.

Figure 5:
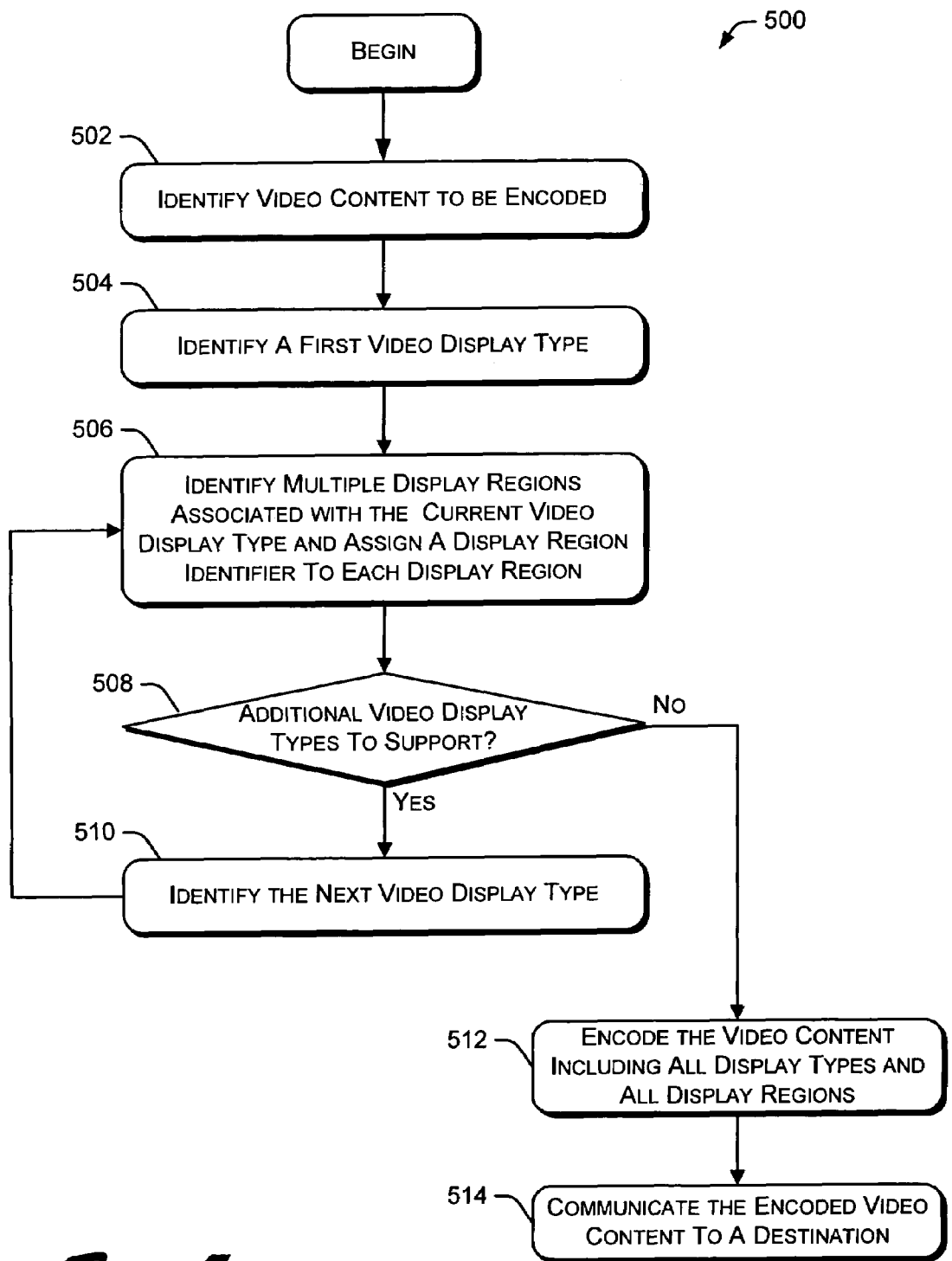
FIG. 5 is a flow diagram illustrating a procedure for encoding video content with information regarding multiple display regions.

FIG. 5 is a flow diagram illustrating a procedure 500 for encoding video content with information regarding multiple display regions, such as the three regions illustrated in FIG. 4. Video content is also referred to as "video data." Initially, the procedure 500 identifies video content to be encoded (block 502). Next, the procedure identifies a first video display type to be supported by the encoded video content (block 504). The procedure then identifies multiple display regions associated with the current video display type and assigns a display region identifier to each display region (block 506).

The location of each display region can be defined by using four parameters: 1) the offset from the top of the image rectangle to the top of the display region, 2) the offset from the left side of the image rectangle to the left side of the display region, 3) the offset from the right side of the image rectangle to the right side of the display region, and 4) the offset from the bottom of the image rectangle to the bottom of the display region. Alternatively, two parameters could identify the four corners of the display region (e.g., the (x,y) location of the upper left corner of the display region and the (x,y) location of the lower right corner of the display region. These numbers may be integer numbers based on the row and column (i.e., line) address of a digital sample, or could have greater precision, such as 1/16th pixel accuracy.

Each display region identifier is included with the definition of the display region. At block 508, the procedure determines whether additional video display types are to be supported. If so, the procedure identifies the next video display type (block 510) and returns to block 508 to identify display regions associated with the next video display type.

If no additional video types are supported at block 508, the procedure branches to block 512, which encodes the video content including all display types and all display regions associated with each display type. Finally, the encoded video content is communicated to a destination (block 514). A destination may be, for example, a transmitter that transmits the encoded video content to one or more receivers, or a recording device that records the encoded video content for future transmission or playback.

Figure 6:
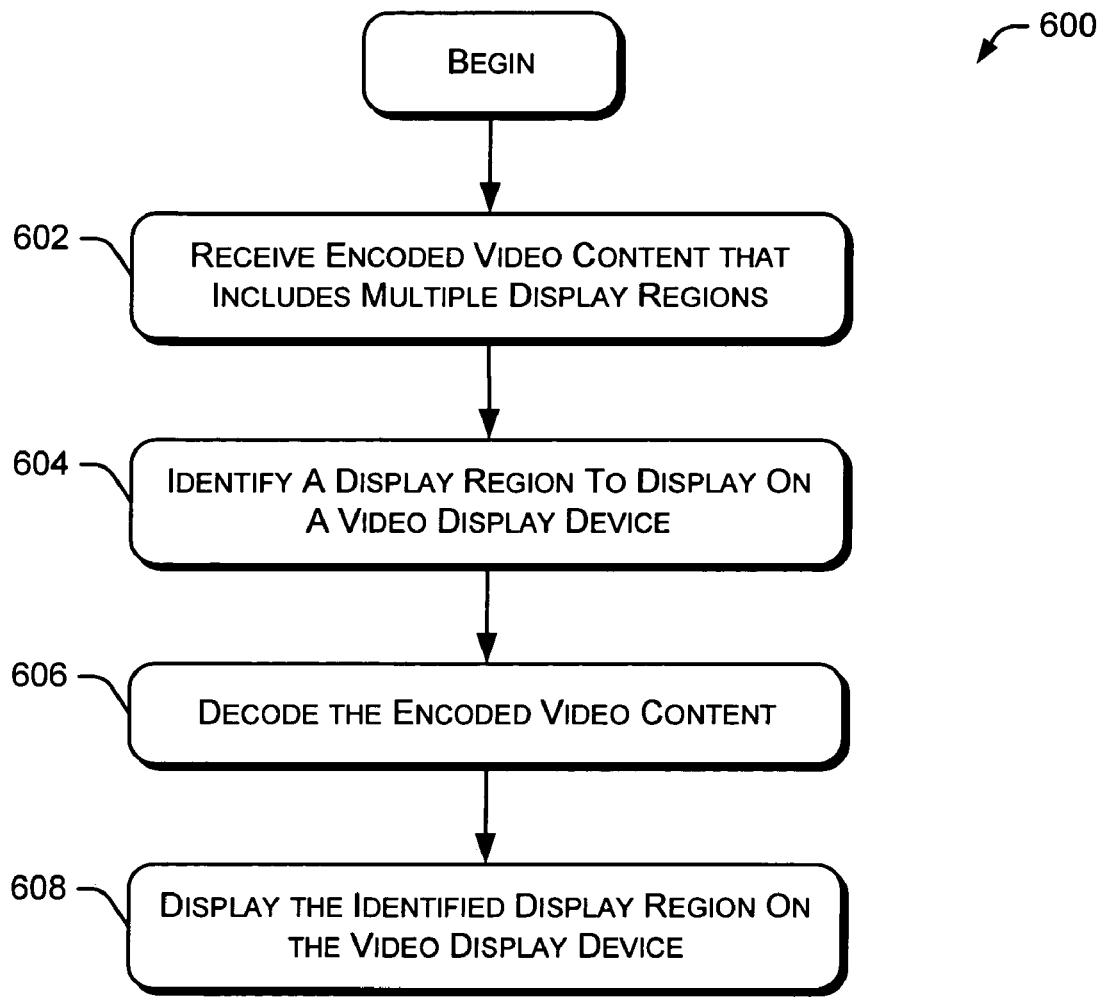
FIG. 6 is a flow diagram illustrating a procedure for decoding video content that includes multiple display regions.

FIG. 6 is a flow diagram illustrating a procedure 600 for decoding video content that includes multiple display regions. The procedure receives encoded video content that includes multiple display regions (block 602). Each of the multiple display regions has an associated display region identifier. The procedure 600 identifies a particular display region to display on a video display device (block 604). For example, a user of the video display device may select the particular display region based on the user's viewing preferences. The procedure then decodes the encoded video content (block 606). Finally, the identified display region is displayed on the video display device (block 608). The identified display region is defined by data included in or transmitted with the video content and may change locations from one frame to the next (e.g., as a character moves).

Figure 7:
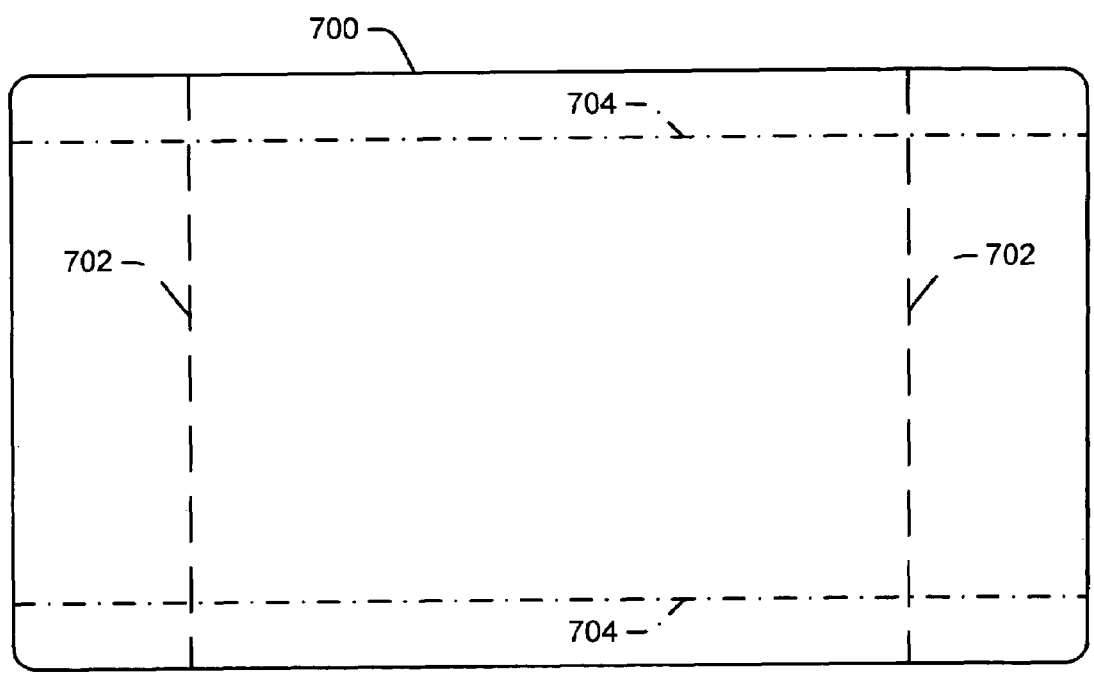
FIG. 7 illustrates an original video image having a display region and an active region.

FIG. 7 illustrates an original video image 700 having a display region and an active region. In this example, the original video image 700 is surrounded by a solid line. The display region aligns with the original video image along the top and bottom edges. The left and right edges of the display region are identified by broken lines 702. Thus, the display region shown in FIG. 7 deletes the original video image 700 located between each broken line 702 and the left or right edge of the original video image. The resulting portion of the original video image 700 that is associated with the display region is bounded on the sides by broken line 702 and bounded on the top and bottom by the original video image.

The active region, defined by broken lines 704, defines the portion of the image that has meaningful information. For example, an active region may exclude portions of an image that contain artifacts or other data that should be discarded. Certain image capture devices may introduce distortion or other undesirable data along the edges of the image. By specifying an active region that does not include the edges of the image, such distortion and other undesirable data is not displayed to the user of a video display device. The active region may be located anywhere within the original video image.

As shown in FIG. 7, the active region is bounded on the top and bottom by broken lines 704, and bounded on the left and right sides by the original video image 700. The portion of the original video image 700 that is not part of the active region is not displayed on a video display device. In this example, the top and bottom edges of the original video image 700 are deleted by the active region boundaries.

The intersection of the active region and the display region is used to determine the actual image displayed on the display device. In the example of FIG. 7, the actual image displayed is bounded by broken lines 702 on the right and left sides, and bounded by broken lines 704 on the top and bottom. Thus, the active region excludes certain portions of the image regardless of the boundaries of the display region. In effect, the active region identifies the size of the output of the decoding process by identifying the portion of the image that has meaningful information.

The example active region illustrated in FIG. 7 eliminates data along the top and bottom edges of the original video image. In alternate embodiments, the active region may delete data from any edges of the original video image, such as all four edges, the two side edges, the top and left side edge, etc. Alternatively, the active region may delete data from any portion (or portions) of the original video image.

Figure 8:
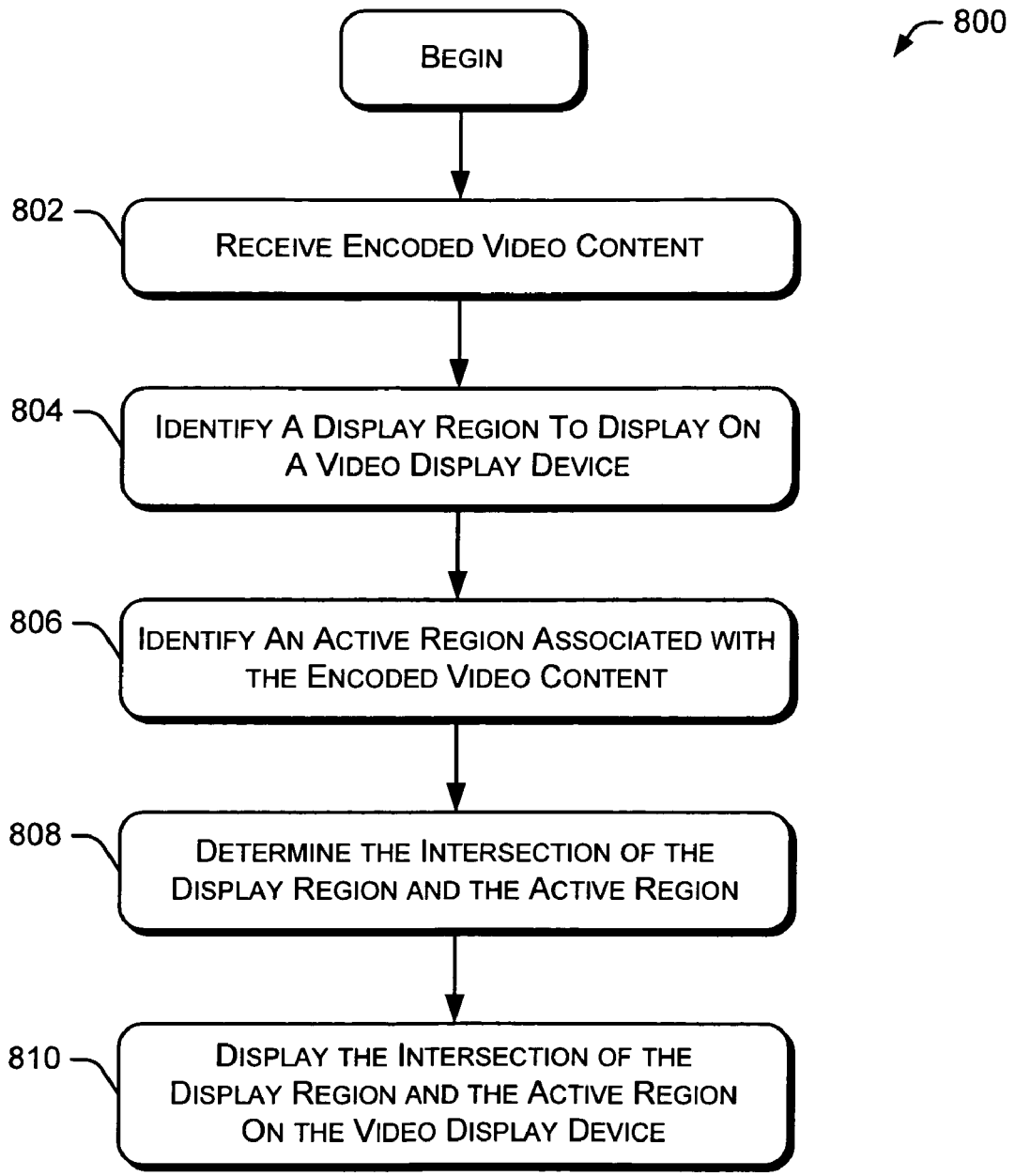
FIG. 8 is a flow diagram illustrating a procedure for displaying encoded video content having both a display region and an active region.

FIG. 8 is a flow diagram illustrating a procedure 800 for displaying encoded video content having both a display region and an active region. Initially, procedure 800 receives encoded video content (block 802). The procedure identifies a display region to display on a video display device (block 804). The display region may be selected, for example, by a user of a video display device. The procedure then identifies an active region associated with the encoded video content (block 806). Next, the procedure determines the intersection of the display region and the active region (block 808). This intersection of the display region and the active region is displayed on the video display device (block 810). If a different display region is selected, the procedure determines the intersection of the new display region and the active region, which is then displayed on the video display device.

Figure 9:
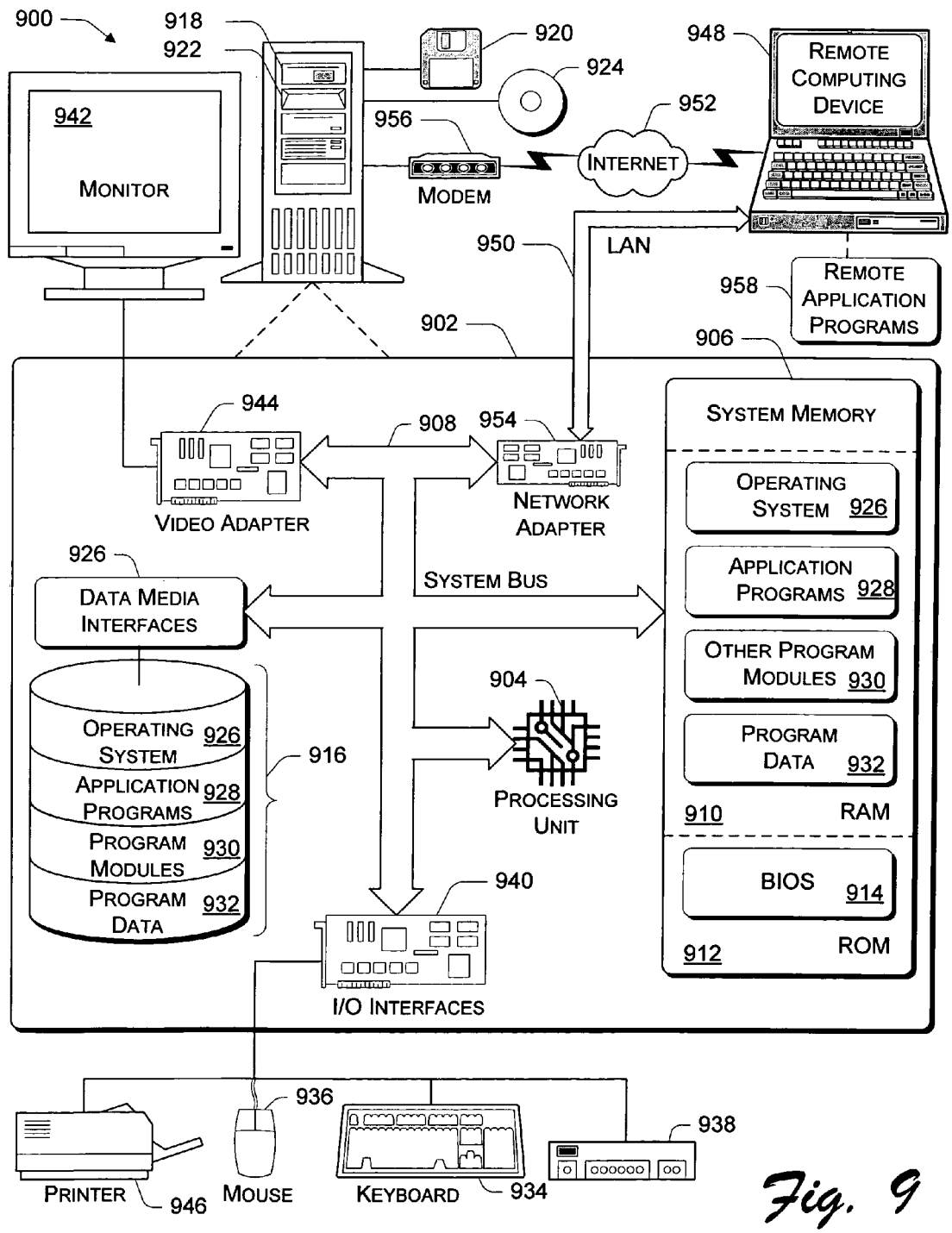
FIG. 9 illustrates an example of a suitable operating environment in which the systems and methods described herein may be implemented.

FIG. 9 illustrates an example of a suitable computing environment 900 within which the video encoding and decoding procedures may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The video encoding and decoding systems and methods described herein may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions may also be implemented in clients of limited resources.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 9 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of the operating system 926, one or more application programs 928, other program modules 930, and program data 932 (or some combination thereof) may include elements of the video encoding and/or decoding algorithms and systems.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and so on. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

An implementation of the system and methods described herein may result in the storage or transmission of data, instructions, or other information across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the systems and methods described herein may be implemented in hardware or a combination of hardware, software, and/or firmware. For example, one or more application specific integrated circuits (ASICs) or programmable logic devices (PLDs) could be designed or programmed to implement one or more portions of the video encoding or video decoding systems and procedures.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
receiving encoded video data, wherein the encoded video data includes display region information that identifies a plurality of display regions for a video image, wherein each of the plurality of display regions provides an option for display of the video image, wherein the display region information allows specification of plural first regions among the plurality of display regions for the video image, the plural first regions being suitable for a first display type, and wherein the display region information further allows specification of plural second regions among the plurality of display regions for the video image, the plural second regions being suitable for a second display type different than the first display type;
identifying a display region to display on a video display device; and
decoding the encoded video data.

2. A method as recited in claim 1 further comprising displaying the video image on the video display device.

3. A method as recited in claim 2 wherein displaying the video image includes displaying the portion of the video image associated with the identified display region.

4. A method as recited in claim 1 wherein each of the plurality of display regions has an associated display region identifier.

5. One or more computer-readable memories containing a computer program that is executable by a processor to perform the method recited in claim 1.

6. A method comprising:
identifying one or more display regions for display of a video image from a video content source, each of the one or more display regions providing an option for the display of the video image;
encoding the video image; and
outputting display region information that specifies each of the one or more display regions for the video image, wherein the display region information allows specification of plural first regions among the one or more display regions for the video image, the plural first regions being suitable for a first display type, and wherein the display region information further allows specification of plural second regions among the one or more display regions for the video image, the plural second regions being suitable for a second display type different than the first display type.

7. The method of claim 6 wherein the first display type has a first aspect ratio and the second display type has a second aspect ratio different than the first aspect ratio.

8. The method of claim 6 wherein the video content source is a capture device or a storage device.

9. The method of claim 6 wherein the display region information includes, for each of the one or more display regions for the video image, a different region identifier for the display region.

10. A method comprising;
receiving display region information that specifies each of one or more display regions for a video image, wherein each of the one or more display regions provides an option for display of the video image, wherein the display region information allows specification of plural first regions among the one or more display regions for the video image, the plural first regions being suitable for a first display type, and wherein the display region information further allows specification of plural second regions among the one or more display regions for the video image, the plural second regions being suitable for a second display type different than the first display type;

decoding the video image; and using one of the one or more display regions for the display of the video image.

11. The method of claim 10 wherein The first display type has a first aspect ratio and the second display type has a second aspect ratio different than the first aspect ratio.

12. The method of claim 10 wherein the display region information includes, for each of the one or more display regions for the video image, four offsets that pararmeterize the display region.

13. The method of claim 12 wherein the four offsets indicate distances relative to an image rectangle.

14. The method of claim 12 wherein the four offsets indicate distances in $\frac{1}{16}$ pixel units.

15. The method of claim 10 wherein the display region information includes, for each of the one or more display regions for the video image, a different region identifier for the display region.

16. The method of claim 10 wherein the display region information allows specification of the plural first regions as overlapping each other.

17. The method of claim 10 wherein the display region information allows specification of the plural second regions as overlapping each other.

* * * * *